(12) United States Patent
Kubo et al.

(10) Patent No.: US 7,738,405 B2
(45) Date of Patent: Jun. 15, 2010

(54) TELECOMMUNICATIONS CONTROL APPARATUS AND A METHOD FOR DETERMINING A COMMUNICATING NODE WITH ELECTRIC POWER INTERFERENCE TAKEN INTO ACCOUNT

(75) Inventors: Yuki Kubo, Osaka (JP); Kosuke Sekiyama, Nagoya (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 625 days.

(21) Appl. No.: 11/671,612

(22) Filed: Feb. 6, 2007

(65) Prior Publication Data
US 2007/0201368 A1  Aug. 30, 2007

(30) Foreign Application Priority Data
Feb. 28, 2006  (JP)  ............................. 2006-053351

(51) Int. Cl.
H04L 12/28 (2006.01)
H04L 12/56 (2006.01)
H04J 3/16 (2006.01)

(52) U.S. Cl. ..................... 370/255; 370/395.2; 370/465
(58) Field of Classification Search ................. 370/229, 370/235, 236, 254, 255, 275, 310, 318, 332, 370/333, 458; 375/259; 455/115.1, 115.3, 455/134, 161.3, 226.1–226.3
See application file for complete search history.

(56) References Cited

U.S. PATENT DOCUMENTS

| | | | | |
|---|---|---|---|---|
| 5,898,740 A * | 4/1999 | Laakso et al. | ................ | 375/346 |
| 5,933,781 A * | 8/1999 | Willenegger et al. | ........ | 455/522 |
| 6,097,710 A * | 8/2000 | Shin | ............................ | 370/332 |
| 6,370,159 B1 * | 4/2002 | Eidson | ........................ | 370/503 |
| 6,414,955 B1 | 7/2002 | Clare et al. | | |
| 7,352,698 B2 * | 4/2008 | Niwano et al. | ............... | 370/230 |
| 2001/0000168 A1 * | 4/2001 | Esmailzadeh et al. | ........ | 455/522 |
| 2002/0082037 A1 * | 6/2002 | Salonaho et al. | ............. | 455/522 |
| 2003/0058821 A1 * | 3/2003 | Lee et al. | ...................... | 370/335 |
| 2005/0053004 A1 * | 3/2005 | Cain et al. | ................... | 370/235 |
| 2005/0085190 A1 | 4/2005 | Nishikawa | | |
| 2005/0232199 A1 * | 10/2005 | Liu et al. | ..................... | 370/331 |

(Continued)

FOREIGN PATENT DOCUMENTS

EP  1128577 A1  8/2001

(Continued)

OTHER PUBLICATIONS

Y. Matsushita, et al., "Wireless LAN Architecture", pp. 47, 53-59 and 69, Kyoritsu Shuppan Co., Ltd., Tokyo, Japan, 1996.

*Primary Examiner*—Chi H Pham
*Assistant Examiner*—Warner Wong
(74) *Attorney, Agent, or Firm*—Rabin & Berdo, P.C.

(57) ABSTRACT

A telecommunications control apparatus is included in each of a plurality of nodes constituting a telecommunications system and includes a reception power decider for determining the reception power value of a control signal received from another node. A control signal decider decides, in accordance with the reception power value of the control signal thus determined, whether or not the own node should communicate with the other node in relation to interference at the own node. A communication controller controls communication between the own node and the other node in accordance with the result of decision made by the control signal decider.

21 Claims, 7 Drawing Sheets

U.S. PATENT DOCUMENTS

| | | |
|---|---|---|
| 2006/0092855 A1* | 5/2006 | Chiu .......................... 370/254 |
| 2006/0166671 A1* | 7/2006 | Rajkotia et al. ............. 455/436 |
| 2009/0041002 A1* | 2/2009 | Marinier ..................... 370/345 |

FOREIGN PATENT DOCUMENTS

| | | |
|---|---|---|
| JP | 2000-315974 A | 11/2000 |
| JP | 2001-044930 A | 2/2001 |
| JP | 2001-274748 A | 10/2001 |
| JP | 2005-086408 A | 3/2005 |
| JP | 2005-347951 A | 12/2005 |

* cited by examiner

TELECOMMUNICATIONS CONTROL APPARATUS AND A METHOD FOR DETERMINING A COMMUNICATING NODE WITH ELECTRIC POWER INTERFERENCE TAKEN INTO ACCOUNT

BACKGROUND OF THE INVENTION

1. Field of the Invention

The present invention relates to a telecommunications control apparatus and a method therefor, and more specifically to a telecommunications control apparatus configured to avoid the conflict of data, otherwise due to radio interference or similar cause, which are transmitted and received between a number of nodes that are spatially distributed in a sensor network, LAN (Local Area Network) or similar system or mounted on mobile bodies.

2. Description of the Prior Art

As systems for allowing a plurality of spatially distributed nodes to transmit and receive data without any conflict, available are the time division multiple access (TDMA) system and the carrier sense multiple access (CSMA) system, such as a CSMA/CA (Carrier Sense Multiple Access with Collision Avoidance) system and a CSMA/CD (Carrier Sense Multiple Access with Collision Detection) system, as taught in Y. Matsushita, et al., "Wireless LAN Architecture", pp. 47, 53-59 and 69, Kyoritsu Shuppan Co., Ltd., Tokyo, Japan, 1996.

The TDMA system, for example, allots a particular time slot to each of a plurality of nodes so as to cause each node to transmit data only in the time slot allotted thereto, and allows the number of channels available for communication at the same time to be increased more easily than the CSMA system. When nodes expected to communicate with each other dynamically change, a certain node plays the role of a central or management node for dynamically allotting time slots to the other nodes. However, a problem with the TDMA system is that, when the central node expected to allot time slots malfunctions, the entire telecommunications system goes down.

In order to solve the above problem, there have been proposed various methods practicable without resorting to a central node, i.e., allowing the individual node to allot time slots in a distributed coordination control fashion for mutual adjustment for thereby avoiding data collisions. That is, the individual nodes interact with each other by transmitting and receiving periodic impulse signals.

More specifically, to adjust the allotment of time slots in the distributed coordination manner, each node controls, by using nonlinear oscillation, the timing for transmitting an impulse signal in response to the timing of impulse signal transmission from another node such that the impulse signal from the own node and the impulse signal from another node are spaced in timing from each other as far as possible.

Further, the methods stated above include a mode in which the interaction between the nodes is continuous in addition to the mode in which it is discrete. To implement the continuous interaction mode, as distinguished from the discrete interaction mode, phase signals are continuously transmitted and received between nodes so as to establish an adequate phase relation for thereby realizing time slot acquisition in the distribution coordination manner.

Moreover, each node generates, as the phase of a virtual node, an estimated communication timing value of another node as the phase of a virtual node on the basis of interaction using impulse and then establishes an adequate phase relation through interaction with the virtual node, also realizing time slot acquisition in the distribution coordination manner.

As stated above, the conventional methods execute timing control by relaying an impulse signal, or control message, instead of assuming two different kinds of communication ranges, i.e., a communication range and an interaction.

Although the conventional methods stated above allow communication to be efficiently held between nodes without any collision of received signals after the establishment of an adequate phase relation or conversion, the problem is that they cannot always establish a phase relation between adequate nodes and hence an adequate communication timing, depending on the characteristic of radio communication. For example, in the case of wired communication, when a plurality of nodes, sharing the same communication channels, start transmitting signals at the same time, the signals collide with each other and cause both data to disappear with the result that a receiving node cannot correctly receive data. By contrast, in the case of wireless communication, only if reception power is sufficiently great, the receiving node can receive data with great reception power even when a plurality of nodes start transmitting signals at the same time.

SUMMARY OF THE INVENTION

It is an object of the present invention to provide a telecommunications control apparatus and a method therefor capable of establishing, in the event of a data collision ascribable to radio interference, an adequate communication timing by optimizing the communication timing adjustment range in accordance with a communication range matching with the wireless communication system or the communication environment.

A telecommunications control apparatus of the present invention is included in each of a plurality of nodes constituting a telecommunications system and includes a reception power decider for determining the reception power value of a control signal received from another node. A control signal decider decides, in accordance with the reception power value of the control signal thus determined, whether or not the own node should communicate with the other node in relation to interference at the own node. A communication controller controls communication between the own node and the other node in accordance with the result of the above decision made by the control signal decider.

A telecommunications control method, a node and a telecommunications system unique to the present invention are also disclosed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

A preferred embodiment of the telecommunications control apparatus in accordance with the present invention will be described hereinafter with reference to the accompanying drawings. The illustrative embodiment is applicable to a sensor network, an ad hoc network or similar communications system in which a number of spatially distributed nodes transmit and receive data over radio channels.

Briefly, the illustrative embodiment allows each node to emit an impulse signal while effectively sensing impulse signals emitted from other, neighboring nodes so as to interact with the neighboring nodes, thereby causing the nodes to allot time slots in a distributed coordination fashion.

In the illustrative embodiment, the telecommunications system includes a plurality of spatially distributed nodes capable of transmitting and receiving data over radio channels. While the nodes included in the illustrative embodiment are not assumed to move during communication, they may, of course, be adapted to move during communication, if desired. A relation between a received signal wave and an interference wave particular to the nodes of the illustrative embodiment will be described before describing the configuration of each node and the function of a control signal decider included in the node.

Generally, assuming that all nodes included in a telecommunications system communicate with the same transmission power as each other and that the communicable range of each node is represented by Rt, the reception of a signal fails due to the influence of an interference wave when an SIR (Signal to Interference power Ratio) is lower than a given threshold value $e_{th}$.

More specifically, assume that, when a certain node is expected to receive a radio signal transmitted from a source node which is away from the node by a distance of d, the radio signal has reception power of Ps, that a radio signal sent from a point which is away from the node by a distance of Ri is an interference signal, and that the interference signal has reception power, or interference power, of Pi. Then, the SIR is expressed as:

$$SIR = Ps/Pi \qquad (1)$$

Further, assuming that the reception power of a received signal is inversely proportional to $\alpha$ power of a distance, the distance d and reception power Ps are related to each other, as follows:

$$Ps = p/d^{\alpha} \qquad (2)$$

where p and $\alpha$ are constant parameters which can be determined by experiments.

The SIR is derived from the above expression (2):

$$SIR = (Ri/d)^{\alpha} \qquad (3)$$

Considering the fact that if the SIR is smaller than a threshold value $e_{th}$, a receipt error occurs due to the influence of the interference wave, as stated earlier, so that the interference range Ri of the interference wave may be expressed as:

$$Ri \leq \alpha\sqrt{e_{th}} \cdot d \qquad (4)$$

Furthermore, assuming that the maximum distance that allows the interference range to lie in the communicable range of the node is $d=D_2$, then $D_2$ is expressed as:

$$D_2 = \frac{Ri}{\sqrt[\alpha]{e_{th}} + 1} \qquad (5)$$

Figure 5:
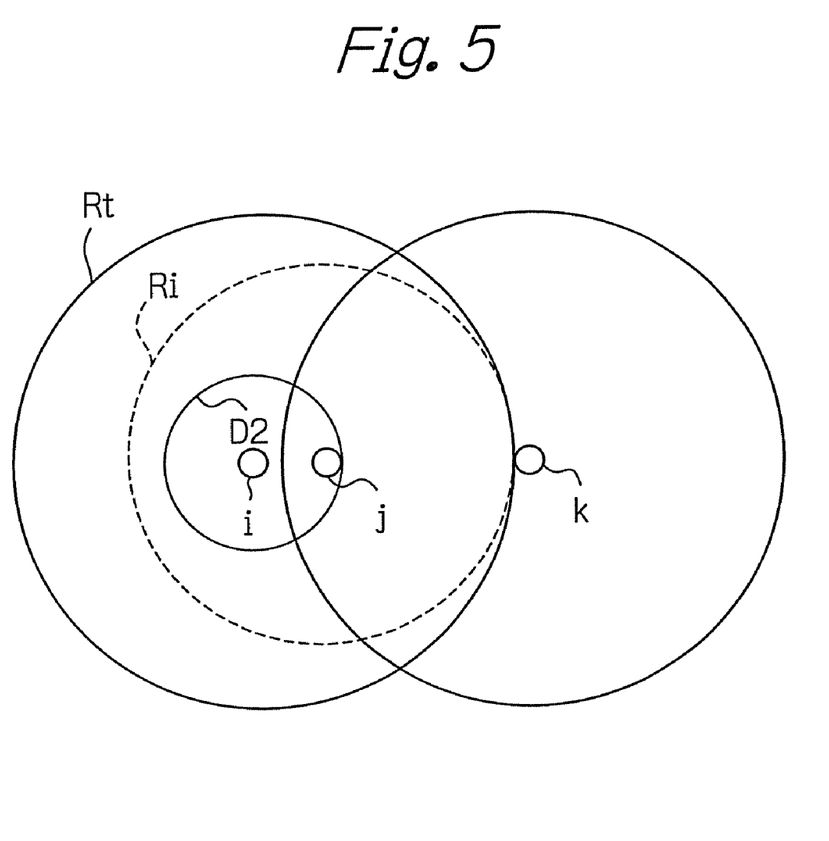
FIG. 5 is an explanatory chart useful for understanding a relation between a communication range and an interference range particular to the illustrative embodiment.

Reference will first be made to FIG. 5 for describing a relation holding between the communicable range Rt of a certain node and the interference range Ri produced by the expression (5) when the condition represented by the expression (5) is satisfied. As shown, while a node j lies in both the communicable range of a node i and the communicable range of a node k, the node j can receive a signal from the node j even when the nodes i and k transmit signals at the same time. Stated another way, so long as the node i does not communicate with a node l ing in its communication range Rt, a signal collision ascribable to radio interference does not occur between the node i and a node lying within a distance of $D_2$ from the node i.

Figure 2:
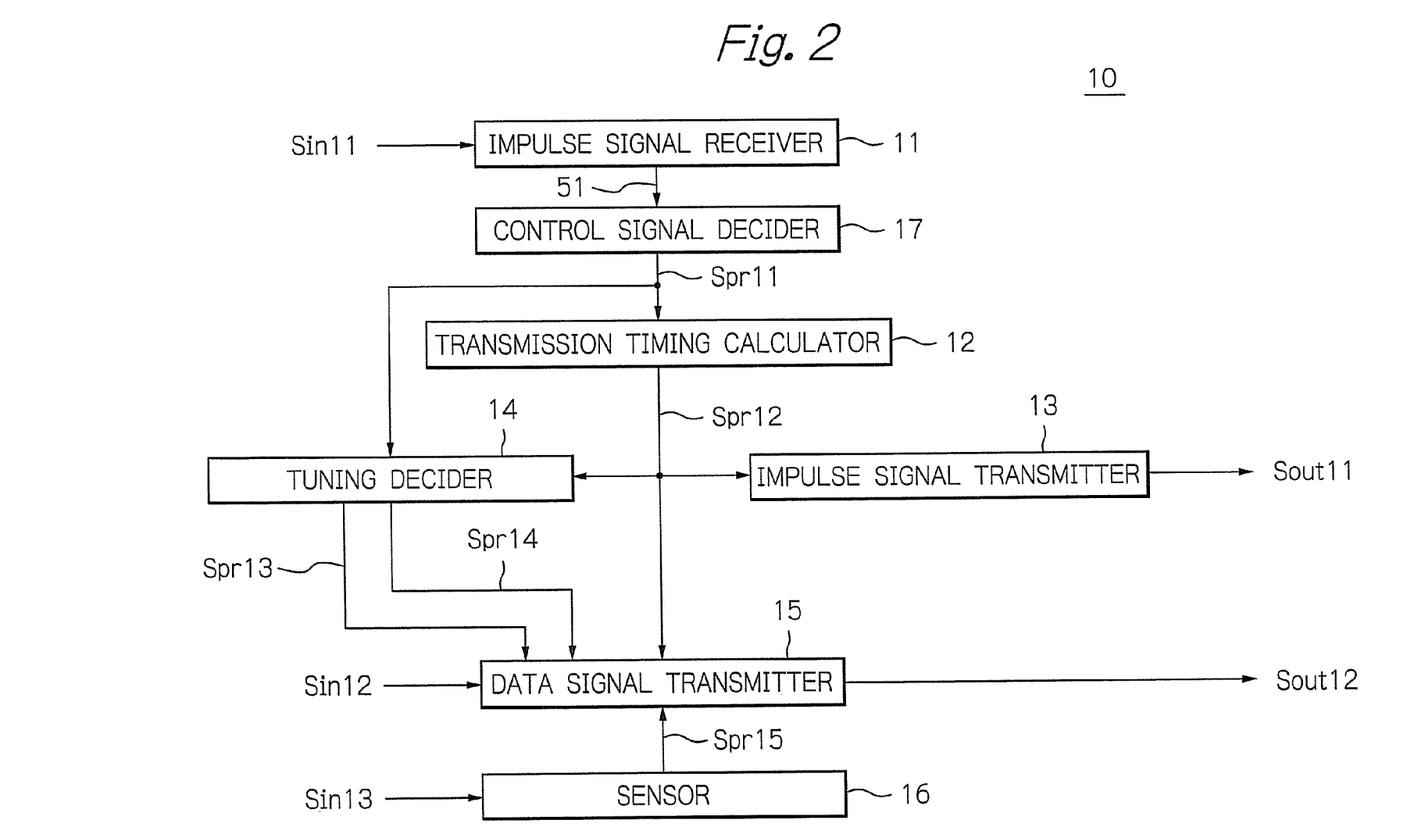
FIG. 2 is a schematic block diagram showing the node embodying the present invention.

Referring to FIG. 2, the node of the illustrative embodiment is shown in a schematic block diagram. As shown, the node, generally 10, is made up of an impulse signal receiver 11, a communication timing calculator 12, an impulse signal transmitter 13, a tuning decider 14, a data signal transmitter/receiver 15, a sensor 16 and a control signal decider 17, which are interconnected as illustrated. In the illustrative embodiment, the impulse signal receiver 11, transmission timing calculator 12, impulse signal transmitter 13, control signal decider 17 and tuning decider 14 constitute a telecommunication control apparatus in combination.

The impulse signal receiver 11 is adapted to receive as an input impulse signal Sin11 an impulse signal transmitted from a neighboring node, e.g., another node lying in a range over which an electromagnetic wave emitted from the node 10 can propagate. The impulse signal received from the neighboring node does not convey destination information. It is to be noted that an impulse signal refers to a signal transmitted and received as a transmission timing signal and has its impulse waveform of a Gaussian or similar distribution. The impulse signal may convey some data information, if desired. A received impulse signal Spr11, which will be described later, may be an impulse signal resulting from shaping the waveform of the received impulse signal Sin11 or an impulse signal regenerated from the received impulse signal Sin11.

The control signal decider 17 is configured to receive the received impulse signal 51, or a control signal as sometimes referred to hereinafter, from the impulse signal receiver 11 and determine, in accordance with a reception power value at the time of receipt of the impulse signal, whether or not communication timing adjustment or control should be executed in response to the impulse signal or control signal. With this configuration, the control signal decider 17 is capable of selecting an impulse signal or control signal received from a node necessary for the transmission timing calculator 12 to determine a transmission timing for thereby accurately determining a node to which communication timing adjustment should be applied. In the following, signals are designated with reference numerals of connections on which they are conveyed.

The transmission timing calculator 12 is adapted to generate a phase signal Spr12, which determines or defines the transmission timing of anode of interest, in response to the received impulse signal Spr11 coming from the control signal decider 17 and feed the phase signal Spr12 to the impulse signal transmitter 13, tuning decider 14 and data transmitter 15. In the illustrative embodiment, the transmission timing calculator 12 is assumed to generate and output the phase signal Spr12 even when the received impulse signal Spr11 is absent.

Assuming that the phase signal of a node of interest i has a value of $\theta_i(t)$ at a time t, then the transmission timing calculator 12 varies, in response to the received impulse signal Spr11, the phase signal Spr12(=$\theta_i(t)$) with a nonlinear oscillation rhythm, as represented by expressions (6) and (7):

$$d\theta_i(t)/dt = \omega_i + \sum_{j=1}^{N} P_j(t) \cdot R(\Delta\theta_{ij}(t)) + \xi(S_i(t)) \quad (6)$$

$$\Delta\theta_{ij}(t) = \theta_j(T) - \theta_i(t) = -\theta_i(t) \quad (7)$$

The above variation of the phase signal realizes a nonlinear characteristic that causes nearby nodes to tend to become opposite in phase (inversion of an oscillation phase) to each other, and uses such a characteristic to avoid collisions. More specifically, in order to prevent the transmission timings of impulse signals Sout11 sent out from neighboring nodes from colliding with each other, the illustrative embodiment establishes a suitable time relation or time lag into a timing at which the phase signals of those nodes take the same value.

Various factors included in the expressions (6) and (7) will be briefly described hereinafter. The expression (6) is representative of a rule for varying the nonlinear oscillation rhythm of the phase signal $\theta_i(t)$ of the own node i (generally referred to as a time evolution rule). In the expression (6), parameters t and i are respectively representative of time and the phase of nonlinear oscillation of the own node at a time t while, in the expression (7), $\Delta\theta_{ij}(t)$ is a phase difference produced by subtracting the phase $\theta i(t)$ of the own node i from the phase $\theta_j(t)$ of a neighboring node j.

Further, in the expression (6), $\omega$ denotes a specific angular frequency parameter. The function $P_j(t)$ is representative of an impulse signal received from the neighboring node j. The function $R(\Delta\theta_{ij}(t))$ is a phase response function expressing a response characteristic that causes the basic rhythm of the own node i to vary in response to an impulse signal Spr11 received from another node. N denotes the total number of neighboring nodes present in a spatial distance range over which the own node i can receive an impulse signal Spr11. The function $\xi(S_i(t))$ is a term that stores stresses when the relative phase difference between the own node i and the neighboring node j is small, and shifts the phase by a random size in accordance with a stored stress value $S_i(t)$.

The functional principle of the transmission timing calculator 12 will be described more specifically with reference to FIGS. 3A through 3C and 4A through 4C. It is to be noted that the function of the impulse signal transmitter 12 also relates to state transitions shown in FIGS. 3A through 4C. Paying attention to a given node, FIGS. 3A through 4C demonstrate a relation between the node of interest or own node i and another node or neighboring node j, i.e., how a phase relation between the nonlinear oscillation rhythms of the nodes i and j varies with the elapse of time. The angles of the material points i and j on the circle are representative of the instantaneous values of phase signals. The circular movements of the material points i and j are projected onto the ordinate or the abscissa to represent the respective nonlinear oscillation rhythms.

Figure 3A:
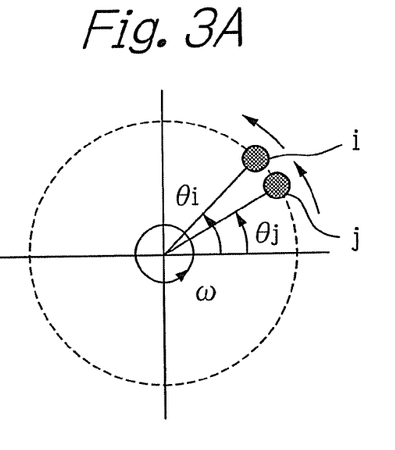
FIGS. 3A, 3B and 3C demonstrate consecutive, initial, transitional and stable conditions, respectively, in which two of the nodes are tuned to each other in the illustrative embodiment.

The two material points i and j tend to become opposite in phase to each other in accordance with the operation represented by the expression (1), which will be described specifically later. As a result, even when the phases of the two material points i and j are close to each other, as shown in FIG. 3A, the state varies as the time elapses via a transitional state shown in FIG. 3B to a stable state shown in FIG. 3C in which the phase difference between the two points i and j is substantially equal to $\pi$.

The two material points i and j rotate at the primary angular velocity equal to the respective specific angular oscillation frequency parameter $\omega$. When the two nodes become interactive in response to impulse signals transmitted therebetween, the two material points i and j vary the angular velocity thereof ahead or behind so as to ultimately establish the stable state at which the appropriate relation is maintained. This operation may be considered to indicate that the two points i and j repel each other while rotating to establish the stable phase relation. In the stable state, FIG. 3C, if each of the two nodes is adapted to transmit the output impulse signal Sout11, FIG. 2, when it is in a predetermined phase, e.g., zero, then both nodes are brought into the transmission timing to establish the appropriate timing relation with each other.

Figure 4A:
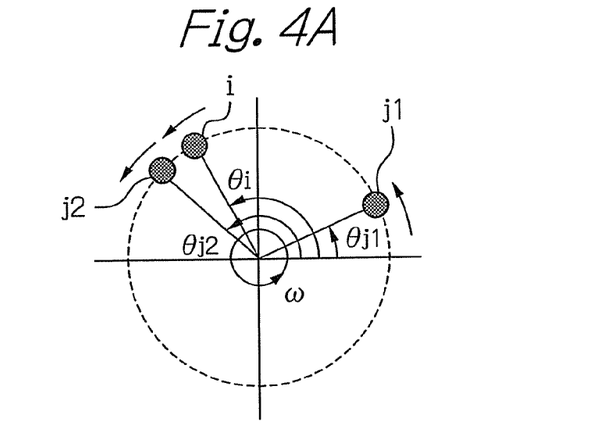
FIGS. 4A, 4B and 4C demonstrate, similarly to FIGS. 3A, 3B and 3C, consecutive, initial, transitional and stable conditions, respectively, in which three of the nodes are tuned to each other in the embodiment.
Figure 4B:
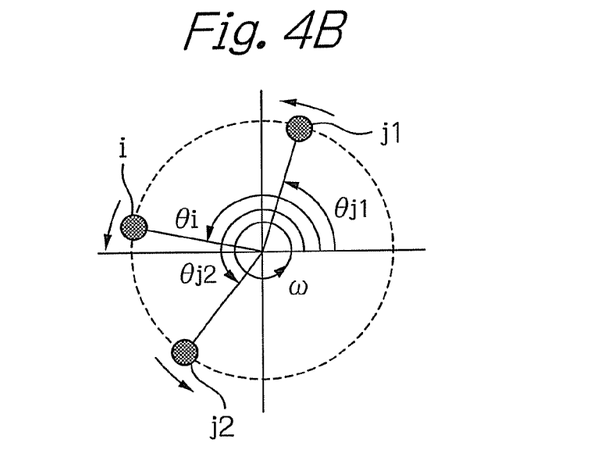
Figure 4C:
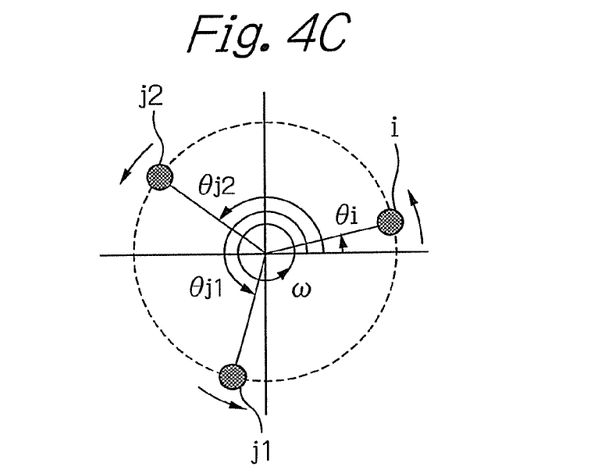

FIGS. 4A, 4B and 4C show another specific case wherein the own node i and two neighboring nodes j1 and j2 exist together. In this case, too, the material points i, j1 and j2 repel each other while in rotation, establishing the stable phase relation with respect to time. This is also true when three or more nodes neighbor the node of interest i.

The stable phase relation or stable state thus established is, in nature, remarkably adaptive to a change in the number of neighboring nodes, i.e. remarkably flexible. For example, assume that, when a single node j1 neighbors the node of interest i in a stable phase relation or stable state, another neighboring node j2 is added. Then, although the stable state is once disturbed, a new stable state is again established with the node of interest i and two neighboring nodes j1 and j2 via a transitional or transient state. This is also true when either one of the neighboring nodes j1 and j2 disappears or fails due to an error or similar cause occurring therein.

Referring again to FIG. 2, the phase signal Spr12 equal to $\theta i(t)$ output from the transmission timing calculator 12 is fed to the impulse signal transmitter 13, tuning decider 14 and data signal transmitter 15, as stated previously. The impulse signal transmitter 13 is adapted for transmitting an output impulse signal Sout11 to the network in response to the phase signal Spr12. More specifically, when the phase signal Spr12 reaches a predetermined phase $\alpha$ lying in the range of $0 \leq \alpha < 2\pi$, the transmission timing calculator 12 commands the impulse signal transmitter 13 to transmit an output impulse signal. The predetermined phase $\alpha$ should preferably be uniform in the entire telecommunications system and will be assumed to be zero hereinafter. In the state shown in FIG. 3C, because the phase signals of the nodes i and j locally differ in phase from each other by n in the stable state, the transmission timings of output impulse signals Sout11 from the node i and j are shifted from each other by n despite that a is uniform in the entire system.

Figure 3B:
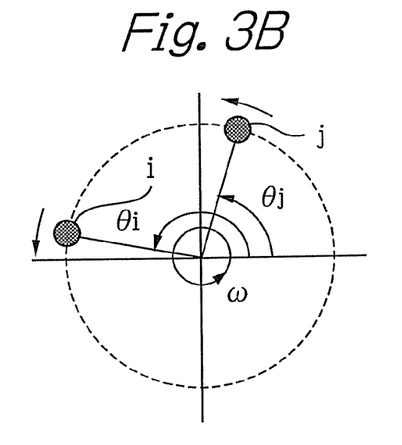
Figure 3C:
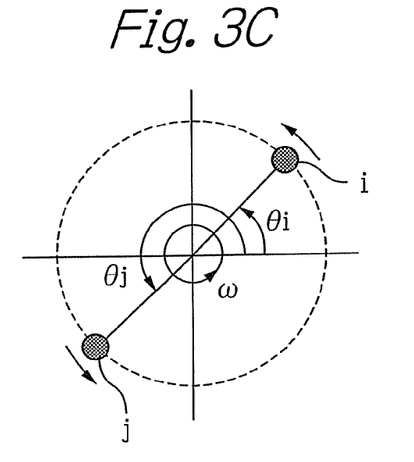

The tuning decider 14 is configured to determine whether the mutual adjustment of the transmission timings of the output impulse signals, which is executed at the own node or between one or more neighboring nodes, is in the transition state shown in FIG. 3B or whether it is in the stable state shown in FIG. 3C or 4C. More specifically, by monitoring the timing at which the received timing signal Spr11, corresponding to an output impulse signal Sout11 sent out from another node, is generated and the timing at which the output impulse signal Sout11 is generated, the tuning decider 14 determines that the above mutual adjustment is in the stable state if a time lag between the generation timings of a plurality of nodes that transmit and receive impulse signals is stable with respect to time. In the illustrative embodiment, the phase signal Spr12 is input to the tuning decider 14 instead of the output impulse signal Sout11 as a signal that allows the decider 14 to grasp the generation timing of the output impulse signal Sout11 from the own node.

To make the above decision on tuning, the transmission timing calculator 12 may execute the following specific sequence of steps. The transmission timing calculator 14 monitors, over a single period of the phase signal Spr12, the value β of the phase signal Spr12 occurring at the input timing of the received impulse signal Spr11 from the control signal decider 17. Assume that the values β of the phase signal Spr12 thus monitored are $\beta 1, \beta 2, \ldots, \beta N (0 < \beta 1 < \beta 2 < \ldots < \beta N < 2\pi)$. The transmission timing calculator 12 then calculates, based on the monitored values β, differences between nearby values, i.e., phase differences $\Delta 1 = \beta 1, \Delta 2 = \beta 2 - \beta 1, \ldots, \Delta N = \beta N - \beta (N-1)$.

The transmission timing calculator 12 executes the steps stated above every period of the phase signal Spr12 to thereby produce variations or differences, $$\gamma 1 = \Delta 1(\tau+1) - \Delta 1(\sigma), \gamma 2 = \Delta 2(\tau+1) - \Delta 2(\tau), \ldots, \gamma N = \Delta N(\tau+1) - \Delta N(\tau)$$

between the phases in the consecutive periods where τ denotes a given phase of the phase signal spr12 while τ+1 denotes a period immediately following the phase signal Spr12. Thereafter, the transmission timing calculator 12 determines that the tuning is in the stable state when the variations γ all are smaller than a small parameter or threshold value ε, i.e., when there hold relations of $$\gamma 1 < \epsilon, \epsilon 2 < \epsilon, \ldots, \gamma N < \epsilon.$$

Alternatively, the transmission timing calculator 12 maybe adapted for determining that the tuning is in the stable state when the relations $$\gamma 1 < \epsilon, \gamma 2 < \epsilon, \ldots, \gamma N < \epsilon$$

are continuously satisfied over a consecutive plurality (M) of periods, in which case the degree of the stable state increases with an increase in the number M of the consecutive periods. Further, the transmission timing calculator 13 may be adapted to make a decision on the stable state in response to part of or some kind of received impulse signals 21.

The tuning decider 14 is adapted to produce, every period of the phase signal Spr12, the tuning decision signal Spr13 representative of the result of decision and a slot signal Spr14, which is the minimum value β1 of the value β of the phase signal Spr12, at the timing of generation of the received impulse signal Spr11 and feed the signals Spr13 and Spr14 thus produced to the data signal transmitter 15. Why the minimum value β1 is output as a slot signal Spr14, as stated above, is related to the parameter β which is assumed to be zero, so that the value of β to be applied to the slot signal Spr14 varies in accordance with the value of α.

The node 10 selectively functions to relay a data signal received from another node or transmits a data signal generated in the node 10 itself. The sensor 16 is adapted to monitor, at the time of transmission of a data signal from the node 10, physical or chemical environment information Sin13, e.g., the strength of sound or vibration, the concentrations of chemical substances or temperature and deliver the environmental information Sin13 to the data signal transmitter 15 as monitored data Spr15. The sensor 16 may, of course, be replaced with any other suitable implement. On the other hand, in the event of relaying a data signal received from another node, the node 10 receives an output data signal Sout12 from a neighboring node as an input data signal Sin12.

The data signal transmitter 15 is adapted for transmitting one or both of the monitored data Spr15 and input data signal Sin12 to another node as an output data signal Sout12. The data signal transmitter 15 executes such transmission in a time slot, which will be described later specifically, when the tuning decision signal Spr13 is representative of the stable state or does not execute the transmission when the signal Spr13 is representative of the transition state. It should be noted that the time slot mentioned above is used for the sake of description although it differs from a fixed time interval assigned by, e.g., a system. If desired, the output data signal Sout12 may be provided with a frequency lying in the same frequency band as the output impulse signal Sout11.

More specifically, in the illustrative embodiment, the time slot mentioned above is a period of time over which the phase signal Spr12 remains in the range of, e.g., $\delta 1 \leq \theta_i(t) \leq \beta 1 - \delta 2$. The start point of the time slot at which the phase signal is assumed to have the above value δ1 coincides with the time when the transmission of an output impulse signal Sout11 ends. On the other hand, the end point of the time slot at which the phase signal is assumed to have the value β1−δ2 is set to the time preceding the timing of the first impulse signal in every period of the phase signal by some amount of offset δ2. The values δ1 and δ2 are defined as a phase width corresponding to a minute or short period of time for ensuring that impulse and data signals do not exit at the same time without regard to the signals having been sent out from the own node or other nodes. The values 1 and 2 may be determined by experiments at the location of the node 10.

For example, in the stable condition shown in FIG. 3C, the node i is configured to transmit an output impulse signal Sout11 when the phase θi is zero, end transmitting the output impulse signal Sout11 before the phase θi reaches δ1, start transmitting a data signal Sout12 when the phase θi is δ1, end transmitting the data signal Sout12 when the phase θi reaches β1−δ2 (β1≈n), and then stop transmitting the output impulse signal Sout11 and output data signal Sout12 until the phase θi again becomes zero. Although the other node j operates in the same manner as the node i on the basis of the phase θj, the transmission of data signals from the nodes i and j are protected from collision because the phases θi and θj are shifted from each other by substantially π. This is also true when the number of nodes is three or more.

Figure 1:
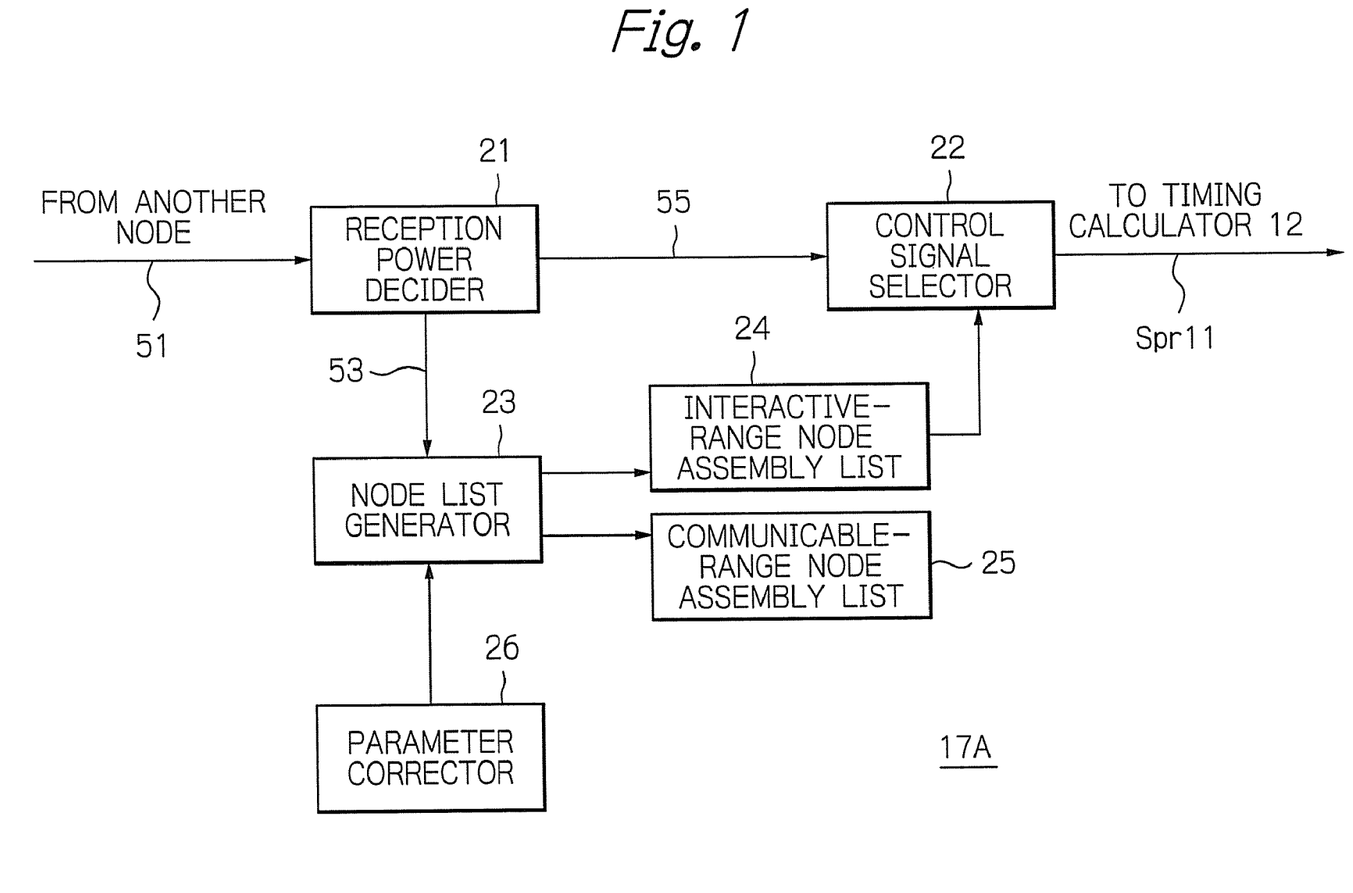
FIG. 1 is a schematic block diagram showing a specific configuration of a control signal decider included in a node embodying the present invention.

Well, FIG. 1 is a schematic block diagram showing a specific configuration, labeled 17A, of the control signal decider 17. As shown, the control signal decider 17A includes a reception power decider 21, a control signal selector 22, a node list generator 23, an interactive-range node assembly list 24, a communicable-range node assembly list 25 and a parameter corrector 26, which are interconnected as depicted. While functions unique to the control signal decider 17A will be described as being implemented by being read by a CPU (Central Processing Unit) or similar hardware source provided on the node 10, FIG. 2, as software, they may be implemented as hardware if allowable in the aspect of circuit configuration.

The reception power decider 21 is adapted to calculate the reception power value of an impulse signal 51 received from another node. The simplest method available with the reception power decider 21 for calculating a reception power value may be measuring the reception power of a signal every time the signal 51 is received. Another method available for the above purpose is producing a mean value of the reception power values of a plurality of consecutive received signals by use of a preselected expression in order to enhance the accuracy of the reception power value. The reception power output 53 thus produced is fed from the reception power decider 21 to the node list generator 23. Further, on the receipt of an impulse signal or control signal 51 from another node, the reception power decider 21 delivers the impulse signal or control signal 55 to the control signal selector 22.

The node list generator 23 is configured to sort a source node having transmitted the control signal or impulse signal into either one of the interactive-range node assembly list 24 and communicable-range node assembly list 25 by referencing the reception power value 53 input from the reception power decider 21, thereby generating the two lists 24 and 25.

How the node list generator 23 sorts the source node will be described more specifically hereinafter. A threshold value $R_{th}$ to be compared with a reception power value is stored in the node list generator 23 beforehand. Also, it is assumed that when a reception power value is equal to the threshold value $R_{th}$, transmission timing adjustment is executed in the range of a distance determined by the expression (2). In the illustrative embodiment, the above range of a distance is assumed to be Rt and set in the node list generator 23. Further, the range of a distance $D_2$, lying in the range of the distance Rt in which communication timing adjustment should be executed when the reception power value is equal to $R_{th}$, but not causing interference to occur, is determined on the basis of the expression (5) and set in the node list generator 23.

As stated above, in the illustrative embodiment, transmission timing adjustment ends after transmitting and receiving control signals, or impulse signals, with a node lying in the range of the distance Rt from a source node. After a transmission timing has been established, it is impossible for a plurality of nodes located at the distance Rt to hold communication at the same time, so that interference does not occur so long as the distance Rt is shorter than the distance D2 between nodes. At this instance, it is assumed that the parameters ρ and β necessary for solving the expressions (2) and (5) are also stored in the node list generator 23.

When the reception power value 53 calculated by the reception power decider 21 is input to the node list generator 23, the node list generator 23 compares the input reception power value with the threshold value $R_{th}$ and deletes the source node if its reception power value is smaller than the threshold value $R_{th}$. This is successful to avoid transmission timing adjustment otherwise executed with a node emitted an impulse signal or control signal whose reception power value is smaller than the threshold value $R_{th}$ and located at a distance greater than the distance Tr.

Further, the node list generator 23 substitutes the received power value input from the reception power decider 21 for the expression (2) for thereby determining a distance between the node 10 and the source node emitted the impulse signal or control signal. The node list generator 23 then compares the distance thus determined and the distance Rt and sorts, if the former is smaller than the latter, the source node into the interactive-range node assembly list 24. Moreover, the node list generator 23 compares the above distance between the node 10 and the source node and the distance D2 and sorts, if the former is smaller than the latter, the source node into the communicable-range node assembly list 25.

The impulse signal or control signal 55 output from the reception power decider 21 is input to the control signal selector 22 also. The control signal selector 22 is adapted to determine whether or not the source node emitted the impulse signal or control signal is listed in the interactive-range node assembly list 24. Only if the source node is listed in the interactive-range node assembly list, then the control signal selector 22 provides the transmission timing calculator 12, FIG. 2, with the receipt of the above impulse signal or control signal.

The parameter corrector 26 is adapted for correcting the parameters necessary for solving the expression (5) set in the node list generator 23. With this function, the parameter corrector 26 is capable of correcting the distance $D_2$ in matching relation to the actual condition of data transmission and reception, thereby causing the distance $D_2$ to approach the optimum value. When the error rate, for example, is higher than a preselected threshold value, the parameter corrector 26 may correct the parameters in such a manner as to reduce the distance $D_2$. A time constant with which a high error rate continues may be made longer than a time constant with which the timing control system executed by the transmission timing calculator 12, FIG. 2, converges, so that stable operation can be implemented.

It is to be noted that the parameter corrector 26 stated above is not essential, i.e., the function of the control signal decider 17 included in the illustrative embodiment is achievable even if the parameter corrector 26 is absent.

As stated above, in a data communications system configured to allow a plurality of nodes to allot time slots in the distributed coordination fashion by locally adjusting a transmission timing with a neighboring node, the illustrative embodiment with the control signal decider 17 is able not only to determine whether or not a collision occurs in response to the arrival of an impulse signal or control signal, but also to determine whether or not electromagnetic interference occurs by taking account of interference, thereby more accurately executing timing adjustment.

Furthermore, the illustrative embodiment is successful to solve a problem that a communication time available for a single node is reduced due to timing adjustment effected with an unnecessarily great number of nodes, and a problem that despite that a long transmission time is available for a single node, packets, in practice, collide with each other due to short nodes to be subjected to communication timing adjustment, resulting in low communication efficiency.

An alternative embodiment of the telecommunications control apparatus in accordance with the present invention will be described hereinafter. In the alternative embodiment, the impulse signal is either one of a reference impulse signal and a response impulse signal. The reference impulse signal is of reporting a timing representative of the start of transmission of a data signal from a node while the response impulse signal is an impulse signal received and then transferred.

In the alternative embodiment, a node transmits and receives the two kinds of impulse signals or control signals mentioned above with neighboring nodes. The present alternative embodiment is also practicable with the circuitry shown in FIG. 2 except for the configuration of the control signal decider 17A. Therefore, structural features unique to a control signal decider included in the alternative embodiment will be described hereinafter with reference to FIG. 6.

Figure 6:
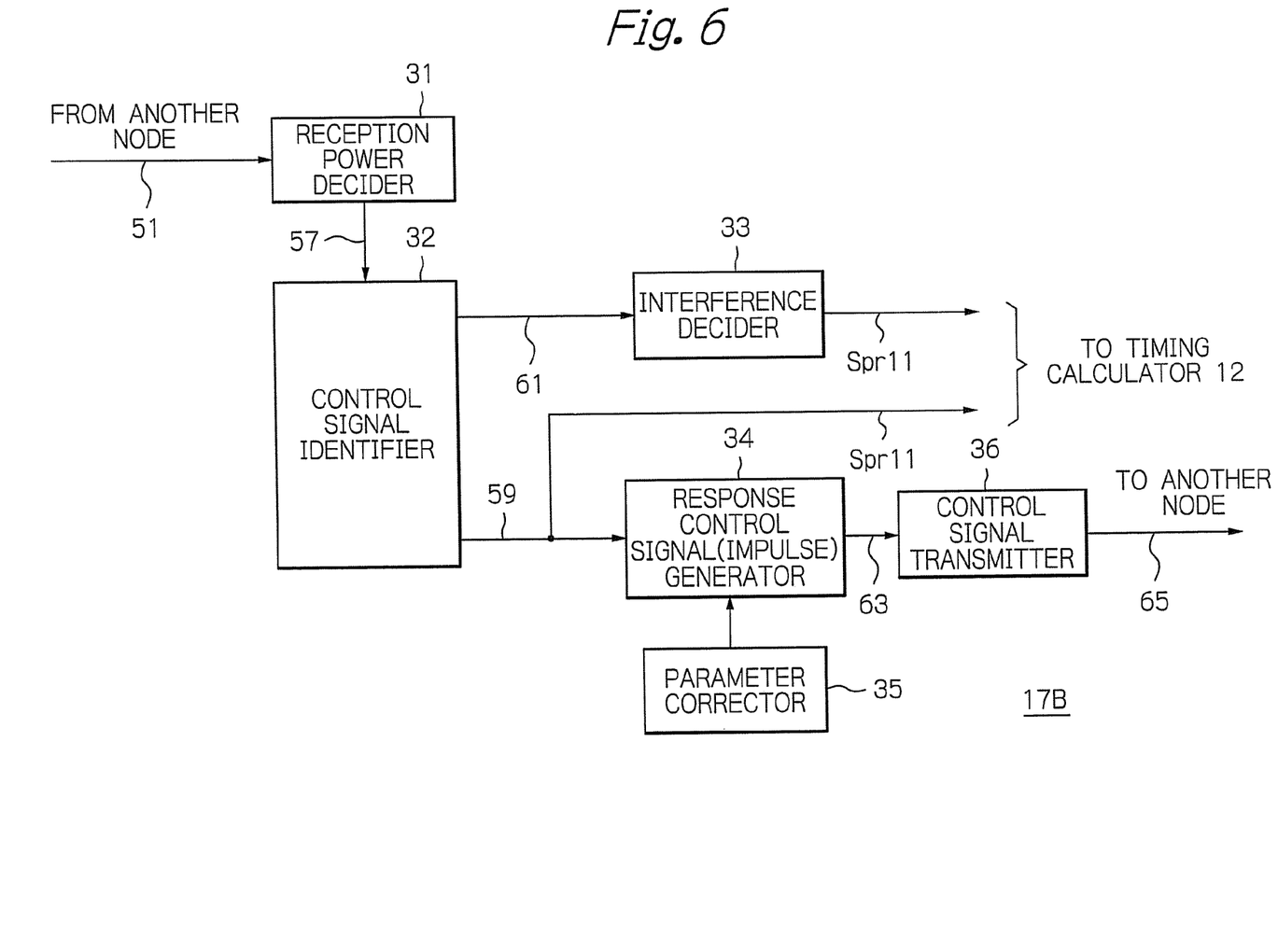
FIG. 6 is a schematic block diagram showing a specific configuration of a control signal decider included in an alternative embodiment of the present invention.

As shown in FIG. 6, a control signal decider, labeled 17B, is generally made up of a reception power decider 31, a control signal identifier 32, an interference decider 33, a response control signal generator 34, a parameter corrector 35 and a control signal transmitter 36, which are interconnected as illustrated. Although the control signal transmitter 36 corresponds to the impulse signal transmitter 13, FIG. 2, it is shown in FIG. 6 for describing a function unique thereto specifically.

The reception power decider 31 is adapted to calculate, when an impulse signal or control signal 51 from another node is received, the reception power value 57 of the received impulse signal The simplest method available with the reception power decider 31 for calculating a reception power value may be measuring the reception power of a signal every time the signal 51 is received. Another method available for the above purpose is producing a mean value of the reception power values of a plurality of consecutive received signals by use of a preselected expression in order to enhance the accuracy of the reception power value. Although measuring a reception power value a plurality of times makes the above calculation more accurate than measuring it only one time, the former makes the calculation cost higher than the latter.

When a plurality of nodes, e.g., nodes A and B communicate with each other, the reception power of a signal transmitted from the node A to the node B and that of a signal transmitted from the node B to the node A are not always the same as each other. In such a case, to allow one node to see the reception power value at the other node, there may be adopted a method that assumes the reception power values at the nodes A and B identical or a method that causes the node B to return a reception power value from the node A to the node A for allowing the node A to accurately see the reception power value actually arrived at the node B. While the latter method allows the one node having transmitted the signal to accurately see a reception power at the other node received the above signal, the latter method makes the calculation cost higher than the former method.

The control signal identifier 32 is adapted to determine whether the received impulse signal or control signal is a reference impulse signal or whether it is a response impulse signal. In order to distinguish the reference and response impulse signals from each other, the impulse signal is provided with a transfer identifier, TTL (Time to Live) field or waveform. To the TTL field of the reference and response impulse signals, a (logical) ONE and a (logical) ZERO are respectively assigned. For example, a particular waveform is assigned to each of the TTL fields defining ONE and ZERO.

The impulse signal identifier 32 is adapted for referencing the TTL field of the received impulse signal to determine whether the received impulse signal is a reference impulse signal that should be transferred or a response impulse signal that should not be transferred. If the received impulse signal is a reference impulse signal, the impulse signal identifier 32 then informs the transmission timing calculator 12, FIG. 2, of the receipt of the input impulse signal and, at the same time, delivers the input impulse signal to the response control signal generator 34, as depicted with a reference numeral 59 in FIG. 6. On the other hand, if the received impulse signal is a response impulse signal, then the impulse signal identifier 32 feeds the input impulse signal to the interference decider 33, as depicted with a connection 61. The impulse signal identifier 32 also has the function of arbitrating the conflict between a plurality of response impulse signals caused by a single reference impulse signal.

The TTL field, used to distinguish the reference and response impulse signals from each other, is not essential to the instant alternative embodiment. Alternatively, an arrangement may be made such that, when a node, having received an impulse signal from the network, cannot identify a TTL field, it determines that the impulse signal is a response impulse signal.

The response control signal generator 34 is adapted to generate, when received the reference impulse signal or reference control signal 59 from the control signal identifier 32, a response impulse signal or response control signal including, e.g., ZERO set in its TTL field and feed the response control signal 63 to the control signal transmitter 36.

Further, the response control signal generator 34 is adapted to write a reception power value, which does not bring about interference, in the response impulse signal in accordance with the reception power value calculated by the reception power decider 31. In the response control signal generator 34, there is set beforehand a parameter representative of a ratio of the reception power value to the interference power value not causing interference to occur, i.e., the degree of interference immunity. The response control signal generator 34 then produces, based on such a parameter and interference power value, a reception power value for protecting the receipt of a reference impulse signal from interference.

Because the ratio of the reception power value to the interference power value not causing collision to occur is generally dependent on, e.g., the communications system and is therefore implemented by a parameter matching with the communications system. Alternatively, the above correction may be executed in accordance with the actual transmission/receipt condition, e.g., in such a manner as to provide, when an error rate is high, the ratio of the reception power value to the interference power value necessary for effecting accurate receipt with a margin.

Further, in order to enhance even allotment of time slots or efficient use of the network, the transmission timing calculator 12, FIG. 2, may be configured to calculate a transmission timing by taking in the receipt timing of an impulse signal from a virtual node although it does not actually receive an impulse signal. In such a case, the control signal generator 34 adds to the reference impulse signal reception strength information received from another node located near a single hop of the own node and information representative of the phase of a virtual node corresponding to a node that lies in the range of one hop of the own node, i.e., information representative of a transmission timing.

The parameter corrector 35 is adapted to correct a parameter necessary for determining a reception power value to be written in the response impulse signal by the response control signal generator 34. It is to be noted that the parameter corrector 35 is not essential to the instant alternative embodiment, i.e., the function of the control signal decider 17B can be implemented without resorting to the parameter corrector 35.

The control signal transmitter 36 is configured to transmit the impulse signal or control signal 63 thus generated by the response control signal generator 34 on its output 65 as a control impulse signal for another node. The control signal transmitter 36 may transmit a response impulse signal as soon as it receives the response impulse signal after the arrival of a reference impulse signal from another node or may temporarily store the response impulse signal and then transmit it, as desired. The latter scheme or temporary impulse signal storage scheme will be described specifically hereinafter with reference to FIG. 7.

Figure 7:
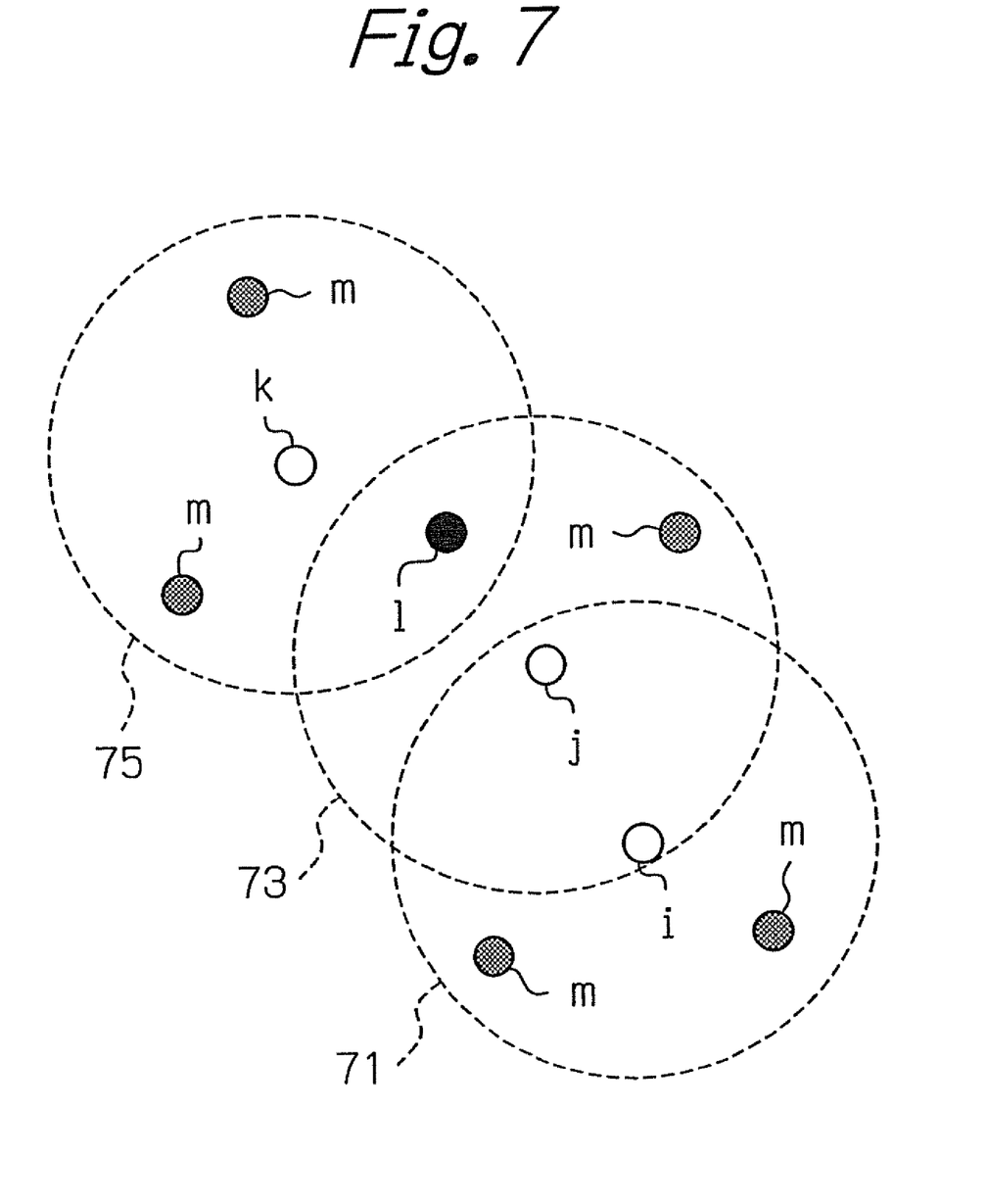
FIG. 7 is another explanatory chart, like FIG. 5, useful for understanding how an impulse signal is transmitted in the embodiment shown in FIG. 6.

FIG. 7 shows a specific condition in which nodes i, j, k and l as well as a plurality of other nodes m are spatially distributed. As shown, the node j lies in the range 71 over which an electromagnetic wave from the node i propagates while the nodes i and l lie in the range 73 over which an electromagnetic wave from the node j propagates. At the same time, the node l lies in the range 75 over which an electromagnetic wave from the node k propagates.

In FIG. 7, assume a specific case wherein when the node i transmits a reference impulse signal, the node j transmits a response impulse signal. Then, the node k, which does not perform timing adjustment with the node i, is likely to start communication at the same time as the node i, resulting in a collision at the node j. However, the collision at the node j is avoidable if the node j does not immediately transmit a response impulse signal, but transmits both the information of the reference impulse signal and that of the response impulse signal at the transmission timing of the own reference impulse signal to thereby shift the transmission timing with respect to the node k.

In the specific case stated above, the impulse signal transmitter is provided with a function of writing a shift from the original transmission time as the information of the response impulse signal by use of, e.g., a timer. This allows a receiving node to determine, by subtracting the shift time from the receipt time of the response impulse signal, the time at which the response impulse signal should have been received.

Referring again to FIG. 6, the interference decider 33 is adapted to compare, when received the response impulse signal 61 from the control signal identifier 32, the reception power value of the response impulse signal with a reception power value written in the response signal. If the receipt power value of the impulse signal is greater than the receipt power value written therein, then the interference decider 33 determines that transmission from the own node would cause interference to occur at the source node transmitted the response impulse signal and then reports the receipt of the impulse signal to the transmission timing calculator 12, FIG. 2, for causing it to execute transmission timing adjustment.

On the other hand, if the receipt power value of the impulse signal is smaller than the receipt power value written therein, the interference decider 33 determines that transmission from the own node would not cause interference to occur at the source node transmitted the response impulse signal and therefore transmission timing control is not necessary. Consequently, the interference decider 33 does not report the receipt of the response impulse signal to the transmission timing calculator 12, FIG. 2.

Now, the problem is that assuming that the minimum receipt power value is −90 dBm, for example, a node having received a reference impulse signal with power as weak as −90 dBm is required to send a response impulse signal as far as a node that allows an interference wave of a power level even weaker than −90 dBm, e.g., −100 dBm in the case where the ratio of the signal level of a signal wave to that of an interference wave to be allowed at the time of data receipt is 10 dB. In practice, it is difficult to send information to such a far node. However, if a value sufficiently greater than the actual, minimum reception power value is selected as the minimum reception power value of a reference impulse signal, it is possible to send a response impulse signal even to the above node which an interference wave can reach.

A specific operation of the node particular to the instant alternative embodiment will be described hereinafter. First, how a node B receives an impulse signal when a node A transmits a reference impulse signal thereto will be described.

On the receipt of an impulse signal 51, the reception power decider 31 included in the node B calculates a receipt power value. At the same time, the reception power decider 31 determines that received impulse signal is a reference impulse signal by referencing the TTL field of the received impulse signal and reports the receipt of the reference impulse signal to the response control signal generator 34. In response, the response control signal generator 34 generates a response impulse signal 59 or 61.

In the above condition, assume that the node B is located at a position where it is ready to receive a reference pulse signal from a node C as well. Further, assume that the reception power value of the reference impulse signal from the node A at the node B is −70 dBm and that, even when the nodes A and C transmit reference impulse signals at the same time, the node B can accurately receive the reference impulse signal from the node A while withstanding interference power only if the reception power value at the node B is −80 dBm. Then, the response control signal generator 34 writes the reception power value of −80 dBm in the response impulse signal. The response impulse signal 63 thus generated by the response control signal generator 34 is fed to the control signal transmitter 36 and then transmitted thereby.

On the other hand, the response impulse signal transmitted from the node B is received by the node C. At this instant, at the node C, the received power decider 31 calculates the reception power value of the received impulse signal while the control signal identifier 32 determines that the received impulse signal is a response impulse signal and then delivers the response impulse signal 61 to the interference decider 33. In response, the interference decider 33 sees that immunity to interference of up to −80 dBm is written in the response impulse signal, and determines that, if power to reach the node or source B transmitted the response impulse signal is greater than the value written in the response impulse signal, transmission from the own node C would cause interference to occur at the node B during communication between the nodes A and B. The interference decider 33 then reports the receipt of the impulse signal to the transmission timing calculator 12, FIG. 2.

By contrast, if the power to reach the source node B transmitted the above response impulse signal is smaller than the reception power value written in the response pulse signal, transmission from the own node C would not cause interference to occur at the node B. In this case, the interference decider 33 determines that the transmission timing adjustment is not necessary, and does not report the receipt of the response impulse signal to the transmission timing calculator 12, FIG. 2.

As stated above, the present alternative embodiment achieves the same advantages as the previous embodiment. In addition, the alternative embodiment makes it unnecessary to prepare a propagation parameter dependent on the propagation of an electromagnetic wave in the environment in which a node is located, thereby implementing the previous embodiment with easier node configuration.

Other alternative embodiments of the present invention will be described herein after although not shown specifically. In the illustrative embodiment described first, it is assumed that the own node writes in an impulse signal a reception power value liable to bring about interference and that transmission timing control is executed between the above node and a node capable of receiving an impulse signal with a greater reception power value. However, the present invention is applicable not only to a telecommunications system using an impulse signal but also to other telecommunication systems because it autonomously determines a range in which transmission from a node brings about interference and a range in which transmission from a node to another node suffers from interference.

Further, any suitable message may be added to the impulse signal instead of the above information. For example, the present invention is applicable even to a mechanism particular to, e.g., a radio LAN system standardized by IEEE (Institute of Electrical and Electronics Engineers) 802.11 standard and configured to obviate conflicts, particularly hidden terminals, by using an RTS (Request To Send) message or a CTS (Clear To Send) message. For example, when a node A transmits an RTS message to a node B while the node B transmits a CTS message, the node B writes in the CTS message a reception power value based on the reception power value of the RTS message and then transmits the CTS message in accordance with the present invention. In this case, a node C, having received the CTS message from the node B, can determine whether or not transmission from the node C would interfere with communication between the nodes A and B in accordance with the present invention and can therefore decide whether or not it should really hold back from transmitting a signal.

It has been customary to hold back from transmitting a signal when a control signal is received without exception without regard to the reception power value. By contrast, by applying the present invention, it is possible to execute strict control over conflicts not on the basis of whether or not a control signal has arrived but on the basis of power strength actually arrived.

While the communication timing calculator 12 included in the illustrative embodiments uses a differential expression represented by the expression (6), the differential expression is merely an example of an expression that defines a calculating method and may, of course, be replaced with a difference expression or recursion formula obtainable by differentiating the expression (6), i.e., by making the continuous time parameter t discrete.

As for other methods of description, there are available a general, nonlinear oscillation or chaos oscillation model represented by, e.g., van del Pol equation, as taught in Morikazu Toda et al. "Nonlinear Dynamics", Kyoritsu Shuppan Co., Ltd., Japan. Of course, such oscillation can be implemented when interaction between nodes is either discrete with respect to time, i.e., pulse-like or continuous. The van del Pol equation models a nonlinear oscillation phenomenon to occur on electric circuitry. Operations based on the van del Pol equation may be mounted on a node as hardware by use of electric circuitry or as software by use of Runge-Kutta method or similar numerical calculating method in general use.

The present invention is not dependent on time, operation status or difference between the methods of describing individual models, e.g., a discrete model and a continuous model or other models each expressing a respective oscillation phenomenon, but can be implemented by using various models each having a particular operation status that varies in accordance with a certain, time evolution rule. Arrangements using models whose operation statuses vary either periodically or chaotically are other embodiments of the present invention.

While the embodiment described first is applied to a system in which a number of spatially distributed nodes transmit and receive data therebetween on radio, the present invention is similarly applicable to, e.g., Ethernet (trademark) or similar LAN system in which such nodes transmit and receive data over wired connections. Also, the present invention is applicable to a network in which different kinds of nodes, e.g., sensors and actuators or severs are connected together by wire and, of course, to a network in which nodes connected by wire and nodes connected by radio exist together.

Further, the present invention may be used as a telecommunications protocol that allows routers to transmit and receive routing tables on Internet at timings different from each other. A router refers to a relaying apparatus configured to distribute each of various information flowing on a network to a particular destination while a routing table refers to a communication path selection rule referenced at the time of distribution.

More specifically, in order to realize efficient communication, it is necessary to update a routing table in accordance with every instantaneous change on a network or in traffic and so forth. In light of this, a number of routers distributed on a network transmit and receive routing tables with each other at preselected time intervals. However, it is known that despite that each router sends a respective routing table independently of the other routers, transmissions from the routers gradually become synchronous or conflict, as taught in Floyd, S., and Jacobson. V., "The Synchronization of Periodic Routing Messages", IEEE/ACM Transactions on Networking, Vol. 2, No. 2, pp. 122-136. This document proposes to solve the above problem by providing the processing period of each node with random variability with respect to a communication protocol to be used for the transmission and reception of routine tables and reports effects achievable with such a scheme. However, the scheme disclosed in the above document is basically dependent only on randomness and cannot achieve sufficient effects.

By contrast, when the present invention is applied to the circumference stated above, it allows neighboring routers to autonomously control time slots for transmitting respective routing tables and therefore causes transmissions from the neighboring routers to occur at different timings from each other. In this sense, the present invention is advantageous over the scheme disclosed in the document stated above.

As stated above, the present invention is a drastic solution to the problems of the conflict or the tuning of data transmitted on any kind of wired or wireless network and can be used as a communication protocol for implementing efficient data communication having both of adaptability and stability.

While in the illustrative embodiments the specific angular frequency parameter $\omega i$ is assumed to be the same throughout the system, such a condition is not essential to the present invention, i.e., a particular parameter $\omega i$ can be assigned to each node without effecting the operation shown and described. For example, the illustrative embodiments are operable even if the values $\omega i$ assigned to nodes are slightly scattered around a reference value in accordance with Gaussian distribution or similar probability distribution.

The present invention is characterized by control over the acquisition of communication timing information, which is a phase signal in the illustrative embodiments, and is not restricted in the usage of the timing information for communication at all. For example, when each node transmits a data signal with a respective frequency, communication may be held without setting time slots, in which case, too, the start of data communication should only be determined in accordance with the communication timing information.

While in the illustrative embodiments the conflict ratio $\Delta\theta ci(t)$ is reflected by the phase ci (T) as a stress response function value and as the switching of the characteristic of the phase response function $\Delta\theta ij(t)$, it may be reflected only as the switching of the characteristic of the phase response function $\Delta\theta ij(t)$.

The entire disclosure of Japanese patent application No. 2006-53351 filed on Feb. 28, 2006 the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A telecommunications control apparatus for use in a particular node of telecommunications system that includes a plurality of nodes, the plurality of nodes including the particular node, said apparatus comprising:
 a control signal receiver to receive a control signal from another node;
 a reception power decider configured to determine a reception power value of the control signal received from the another node;
 a control signal decider configured to decide, in accordance with the reception power value of the control signal determined by said reception power decider, whether or not the particular node should communicate with the another node in relation to interference at said particular node; and
 a communication controller configured to control communication between the particular node and the another node in accordance with a result of a decision made by said control signal decider,
 wherein said control signal decider comprises:
  a node sorter configured to determine a distance between the particular node and the another node from the reception power value of the control signal in accordance with a preselected rule, and determine, in accordance with the distance determined, whether or not the another node is a node communicable with the particular node; and
  a control signal identifier configured to reference a result of sorting executed by said node sorter to determine whether or not the control signal received this time is representative of the another node communicable with the particular node.

2. The apparatus in accordance with claim 1, wherein said node sorter is configured to dynamically adjust sorting into a communicable node.

3. A telecommunications control apparatus for use in a particular node of telecommunications system that includes a plurality of nodes, the plurality of nodes including the particular node, said apparatus comprising:
 a control signal receiver to receive a control signal from another node;
 a reception power decider configured to determine a reception power value of the control signal received from the another node;
 a control signal decider configured to decide, in accordance with the reception power value of the control signal determined by said reception power decider, whether or not the particular node should communicate with the another node in relation to interference at said particular node; and
 a communication controller configured to control communication between the particular node and the another node in accordance with a result of a decision made by said control signal decider,
 wherein the control signal comprises a reference control signal and a response control signal transmitted and received between the particular node and the another node in two consecutive steps, and
 wherein said control signal decider includes a response control signal generator configured to generate, when the reference control signal is received, the response control signal having a reception power value of the reference control signal and cause the response control signal to be transmitted.

4. The apparatus in accordance with claim 3, further comprising a parameter corrector configured to correct a parameter of interference resistance adapted for generating the response control signal.

5. The apparatus in accordance with claim 3, wherein said control signal decider includes an interference decider configured to compare, when the response control signal is received, the reception power value of the response control signal and a reception power value of the response control signal at a source node and determine, in accordance with a result of comparison, whether or not interference at the source node would occur due to a transmission from the particular node.

6. The apparatus in accordance with claim 3, further comprising a timing calculator configured to determine a transmission timing of a timing signal of the particular node by using a reception timing of a timing signal, which is the control signal received from the another node, and determine a transmission time slot of a data signal in accordance with the transmission timing and the reception timing of the timing signal from the another node.

7. A particular node included in a telecommunications system, which includes a plurality of nodes, the particular node including a telecommunications control apparatus, said apparatus comprising:
 a reception power decider configured to determine a reception power value of a control signal received from another node;
 a control signal decider configured to decide, in accordance with the reception power value of the control signal determined by said reception power decider, whether or not the particular node should communicate with the another node in relation to interference at said particular node; and
 a communication controller configured to control communication between the particular node and the another node in accordance with a result of a decision made by said control signal decider,
 wherein said control signal decider comprises:
  a node sorter configured to determine a distance between the particular node and the another node from the reception power value of the control signal in accordance with a preselected rule, and determine, in accordance with the distance determined, whether or not the another node is a node communicable with the particular node; and
  a control signal identifier configured to reference a result of sorting executed by said node sorter to determine whether or not the control signal received this time is representative of the another node being communicable with the particular node.

8. A telecommunications system comprising a plurality of nodes each of which includes a telecommunications control apparatus, said apparatus comprising:
 a reception power decider configured to determine a reception power value of a control signal received from another node;
 a control signal decider configured to decide, in accordance with the reception power value of the control signal determined by said reception power decider, whether or not the node that received the control signal should communicate with the another node in relation to interference at the node that received the control signal; and
 a communication controller configured to control communication between the node that received the control signal and the another node in accordance with a result of a decision made by said control signal decider, wherein said control signal decider comprises:

a node sorter configured to determine a distance between the node that received the control signal and the another node from the reception power value of the control signal in accordance with a preselected rule, and determine, in accordance with the distance determined, whether or not the another node is a node communicable with the node that received the control signal; and a control signal identifier configured to reference a result of sorting executed by said node sorter to determine whether or not the control signal received this time is representative of the another node being communicable with the node that received the control signal.

9. A method for controlling telecommunications in a telecommunications system, said method comprising the steps of:

preparing a particular node of the telecommunications system together with another node of the telecommunications system, the particular node including a reception power decider, a control signal decider and a communication controller;

causing the reception power decider to determine a reception power value of a control signal received from the another node;

causing the control signal decider to decide, in accordance with the reception power value of the control signal determined by the reception power decider, whether or not the particular node should communicate with the another node in relation to interference at the particular node; and causing the communication controller to control communication between the particular node and the another node in accordance with a result of a decision made by the control signal decider, wherein said step of causing the control signal decider to decide comprises the substeps of:

preparing a node sorter and a control signal identifier;

causing the node sorter to determine a distance between the particular node and the another node from the reception power value of the control signal in accordance with a preselected rule, and determine, in accordance with the distance determined, whether or not the another node is a node communicable with the particular node; and causing the control signal identifier to reference a result of sorting executed by said node sorter to determine whether or not the control signal received this time is representative of the another node being communicable with the particular node.

10. A method for controlling telecommunications in a particular node that is included in a telecommunications system together with another node, said method comprising the steps of:

determining a reception power value of a control signal received from the another node;

deciding whether or not the particular node should communicate with the another node in relation to interference at the particular node in accordance with the reception power value of the control signal determined by said step of determining; and controlling communication between the particular node and the another node in accordance with a result of a decision made by said deciding step, wherein said step of deciding comprises the substeps of:

determining a distance between the particular node and the another node from the reception power value of the control signal in accordance with a preselected rule, and determining, in accordance with the distance determined, whether or not the another node is a node communicable with the particular node; and referencing a result of said substep of determining to determine whether or not the control signal received this time is representative of the another node being communicable with the particular node.

11. The apparatus in accordance with claim 1, further comprising a timing calculator configured to determine a transmission timing of a timing signal of the particular node by using a reception timing of a timing signal, which is a control signal received from the other node, and determine a transmission time slot of a data signal in accordance with the transmission timing and the reception timing of the timing signal from the another node.

12. A particular node included in a telecommunications system, which includes a plurality of nodes, and including a telecommunications control apparatus, said apparatus comprising:

a reception power decider configured to determine a reception power value of a control signal received from another node;

a control signal decider configured to decide, in accordance with the reception power value of the control signal determined by said reception power decider, whether or not the particular node should communicate with the another node in relation to interference at said particular node; and a communication controller configured to control communication between the particular node and the another node in accordance with a result of a decision made by said control signal decider, and wherein the control signal comprises a reference control signal and a response control signal transmitted and received between the particular node and the another node in two consecutive steps, wherein said control signal decider includes a response control signal generator configured to generate, when the reference control signal is received, the response control signal having a reception power value of the reference control signal and cause the response control signal to be transmitted.

13. The node in accordance with claim 12, wherein the control signal decider comprises a parameter corrector configured to correct a parameter of interference resistance adapted for generating the response control signal.

14. The node in accordance with claim 12, wherein said control signal decider includes an interference decider configured to compare, when the response control signal is received, the reception power value of the response control signal and a reception power value of the response control signal at a source node and determine, in accordance with a result of comparison, whether or not interference at the source node would occur due to a transmission from the particular node.

15. The node in accordance with claim 12, wherein the telecommunications control apparatus further comprises a timing calculator configured to determine a transmission timing of a timing signal of the particular node by using a reception timing of a timing signal, which is a control signal received from the another node, and determine a transmission time slot of a data signal in accordance with the transmission timing and the reception timing of the timing signal from the another node.

16. A telecommunications system comprising a plurality of nodes each of which includes a telecommunications control apparatus, said apparatus comprising:
- a reception power decider configured to determine a reception power value of a control signal received from another node;
- a control signal decider configured to decide, in accordance with the reception power value of the control signal determined by said reception power decider, whether or not the node that received the control signal should communicate with the another node in relation to interference at said node that received the control signal; and
- a communication controller configured to control communication between the node that received the control signal and the another node in accordance with a result of a decision made by said control signal decider,
- wherein the control signal comprises a reference control signal and a response control signal transmitted and received between the node that received the control signal and the another node in two consecutive steps, and
- wherein said control signal decider includes a response control signal generator configured to generate, when the reference control signal is received, the response control signal having a reception power value of the reference control signal and cause the response control signal to be transmitted.

17. The system in accordance with claim 16, wherein the control signal decider comprises a parameter corrector configured to correct a parameter of interference resistance adapted for generating the response control signal.

18. The system in accordance with claim 16, wherein said control signal decider includes an interference decider configured to compare, when the response control signal is received, the reception power value of the response control signal and a reception power value of the response control signal at a source node and determine, in accordance with a result of comparison, whether or not interference at the source node would occur due to a transmission from the node that received the control signal.

19. The system in accordance with claim 16, wherein the telecommunications control apparatus comprises a timing calculator configured to determine a transmission timing of a timing signal of the node that received the control signal by using a reception timing of a timing signal, which is a control signal received from the another node, and determine a transmission time slot of a data signal in accordance with the transmission timing and the reception timing of the timing signal from the another node.

20. A method controlling telecommunications in a telecommunications system, said method comprising the steps of:
- preparing a particular node that is included in the telecommunications system together with another node, the particular node including a reception power decider, a control signal decider and a communication controller;
- causing the reception power decider to determine a reception power value of a control signal received from the another node;
- causing the control signal decider to decide, in accordance with the reception power value of the control signal determined by the reception power decider, whether or not the particular node should communicate with the another node in relation to interference at the particular node; and
- causing the communication controller to control communication between the particular node and the another node in accordance with a result of a decision made by the control signal decider,
- wherein the control signal comprises a reference control signal and a response control signal transmitted and received between the particular node and the another node in two consecutive steps; and
- wherein the method further comprises the step of causing the control signal decider to generate, when the reference control signal is received, the response control signal having a reception power value of the reference control signal and cause the response control signal to be transmitted.

21. A method controlling telecommunications in a particular node that is included in a telecommunications system together with another node, said method comprising the steps of:
- determining a reception power value of a control signal received from the another node;
- deciding whether or not the particular node should communicate with the another node in relation to interference at the particular node in accordance with the reception power value of the control signal determined by said step of determining; and
- controlling communication between the particular node and the another node in accordance with a result of a decision made by said deciding step,
- wherein the control signal comprises a reference control signal and a response control signal transmitted and received between the particular node and the another node in two consecutive steps; and
- wherein the method further comprises the step of generating, when the reference control signal is received, the response control signal having a reception power value of the reference control signal and transmitting the response control signal.

* * * * *